(12) United States Patent
Pentland et al.

(10) Patent No.: US 10,307,851 B2
(45) Date of Patent: Jun. 4, 2019

(54) TECHNIQUES FOR PROVIDING STOP-OFFS FOR BRAZING MATERIALS OR OTHER MATERIALS ON STRUCTURES BEING JOINED

(71) Applicant: Raytheon Company, Waltham, MA (US)

(72) Inventors: Christopher E. Pentland, Vail, AZ (US); Ryan J. Reeser, Oro Valley, AZ (US); Desirée L. Schaub, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 222 days.

(21) Appl. No.: 15/379,252

(22) Filed: Dec. 14, 2016

(65) Prior Publication Data

US 2018/0161904 A1    Jun. 14, 2018

(51) Int. Cl.
*B23K 31/02* (2006.01)
*B23K 1/20* (2006.01)
(Continued)

(52) U.S. Cl.
CPC .............. *B23K 1/20* (2013.01); *B23K 1/0012* (2013.01); *B23K 26/355* (2018.08);
(Continued)

(58) Field of Classification Search
CPC ...... B23K 1/0008; B23K 1/0012; B23K 1/20; B23K 2101/04–2101/14; B23K 26/355; B23K 37/06; B23K 26/364
(Continued)

(56) References Cited

U.S. PATENT DOCUMENTS

| 2,473,887 A | * | 6/1949 | Jennings | .................. B23K 1/18 |
| | | | | 106/2 |
| 3,110,102 A | * | 11/1963 | Pfefferkorn | .......... B23K 35/224 |
| | | | | 106/2 |

(Continued)

FOREIGN PATENT DOCUMENTS

| DE | 19922673 C1 * | 8/2000 | ............. B21D 53/08 |
| DE | 102011010317 A1 | 8/2012 | |

(Continued)

OTHER PUBLICATIONS

International Search Report and Written Opinion of the International Searching Authority dated Dec. 1, 2017 for PCT Patent Application No. PCT/US2017/044973, 13 pages.

(Continued)

*Primary Examiner* — Kiley S Stoner

(57) ABSTRACT

A method includes obtaining multiple components to be coupled together, such as during a brazing operation. At least one of the multiple components includes a stop-off. The stop-off includes one or more markings formed on at least one surface of the at least one component. The one or more markings include (i) one or more etches in the at least one surface and/or (ii) one or more oxides formed by localized heating of the at least one surface. The method also includes coupling the multiple components together using a melted or liquid material, such as a filler metal used in the brazing operation. The stop-off controls or interrupts a flow of the melted or liquid material in a joint between the multiple components during the coupling. The one or more markings could interfere with a capillary action that pulls the melted or liquid material into the joint.

20 Claims, 4 Drawing Sheets

(51) Int. Cl.
    *B23K 26/364*   (2014.01)
    *B23K 1/00*     (2006.01)
    *B23K 37/06*    (2006.01)
    *B23K 26/352*   (2014.01)
    *B23K 101/06*   (2006.01)

(52) U.S. Cl.
    CPC .............. *B23K 26/364* (2015.10); *B23K 37/06* (2013.01); *B23K 2101/06* (2018.08)

(58) Field of Classification Search
    USPC .................. 228/183, 215, 216, 39, 203, 204
    See application file for complete search history.

(56) References Cited

U.S. PATENT DOCUMENTS

| | | | | |
|---|---|---|---|---|
| 3,150,446 | A * | 9/1964 | Todd | B23K 1/18 228/164 |
| 3,478,413 | A | 11/1969 | Gadd | |
| 3,750,266 | A * | 8/1973 | Hikido | B23K 1/00 228/215 |
| 3,767,282 | A * | 10/1973 | Poley | H01J 11/00 228/215 |
| 3,906,617 | A | 9/1975 | Behringer et al. | |
| 4,357,069 | A * | 11/1982 | Milora | H01R 12/57 228/215 |
| 5,135,156 | A * | 8/1992 | Bower | B23K 1/0014 228/181 |
| 5,184,767 | A * | 2/1993 | Estes | B23K 35/0227 228/13 |
| 5,282,565 | A * | 2/1994 | Melton | H01L 24/16 228/180.22 |
| 6,378,758 | B1 * | 4/2002 | Haba | H01L 23/49811 228/180.1 |
| 6,431,432 | B1 * | 8/2002 | McCormick | H01L 21/4853 228/215 |
| 6,460,754 | B1 * | 10/2002 | Messelling | B23K 1/20 228/214 |
| 6,510,976 | B2 * | 1/2003 | Hwee | H01L 24/17 228/180.22 |
| 6,577,012 | B1 * | 6/2003 | Greenwood | H01L 21/4842 257/766 |
| 2006/0255102 | A1 * | 11/2006 | Snyder | H01L 23/498 228/203 |
| 2008/0097248 | A1 * | 4/2008 | Munoz | A61M 25/0009 600/585 |
| 2008/0206928 | A1 * | 8/2008 | Onishi | B23K 1/20 438/125 |
| 2010/0089979 | A1 * | 4/2010 | Irslinger | B23K 1/19 228/176 |
| 2012/0234595 | A1 * | 9/2012 | Tamura | H05K 3/3426 174/70 R |
| 2013/0015165 | A1 * | 1/2013 | Wang | B23K 1/20 219/121.67 |
| 2015/0223329 | A1 * | 8/2015 | Brunner | H01L 21/4846 361/777 |
| 2015/0296623 | A1 * | 10/2015 | Trinh | H01L 23/49582 174/260 |
| 2017/0110390 | A1 | 4/2017 | Hinrich et al. | |

FOREIGN PATENT DOCUMENTS

| | | |
|---|---|---|
| DE | 102014104819 A1 | 10/2015 |
| WO | 2005043966 A1 | 5/2005 |

OTHER PUBLICATIONS

"Brazing" from Wikipedia, the free encyclopedia, downloaded Nov. 7, 2016, 34 pages available at https://en.wikipedia.org/wiki/Brazing.

Brazing Aids: Nicrobraz Stop-Off, Flux, Cements & Grits—Wall Colmonoy, downloaded Nov. 9, 2016, 2 pages, available at http://www.wallcolmonoy.com/products-capabilities/brazing-alloys.

Brazing Alloys, Nicrobraz, Niferobraz, & CuBraz,—Wall Colmonoy, downloaded Nov. 9, 2016, 3 pages, available at http://www.wallcolmonoy.com/products-capabilities/brazing-alloys.

Dan Kay, Using a "Stop-Off" in Brazing, Jun. 27, 2011, 3 pages, available at https://vacaero.com/?s=Using+a+% 22Stop-Off%22+in+Brazing.

Lucas Milhaupt, Stop-Off / Brazing & Soldering Manufacturer / Lucas-Milhaupt, Mar. 19, 2013, 3 pages., available at http://www.lucasmilhaupt.com/en-US/about/blog/2013/3/stop-off-blog.

Aimtek, Flux and Brazing Aids, downloaded Nov. 9, 2016, 4 pages, available at http://www.aimtek.com/brazing-alloys/flux-brazing-aids.

* cited by examiner

TECHNIQUES FOR PROVIDING STOP-OFFS FOR BRAZING MATERIALS OR OTHER MATERIALS ON STRUCTURES BEING JOINED

GOVERNMENT RIGHTS

This invention was made with U.S. government support under contracts HQ0276-10-C-0005 and HQ0276-15-C-0003 awarded by the U.S. Department of Defense. The U.S. government may have certain rights in this invention.

TECHNICAL FIELD

This disclosure generally relates to techniques for physically joining multiple structures. More specifically, this disclosure relates to techniques for providing stop-offs for brazing materials or other materials on structures being joined.

BACKGROUND

Brazing is a technique used to physically join multiple metallic structures together. In conventional brazing techniques, metallic structures and a filler metal are heated, causing the filler metal to melt and flow into at least one joint between the metallic structures. The filler metal then cools and hardens to create a metallurgical bond between the metallic structures, physically attaching the structures. The filler metal has a lower melting point than the metallic structures, allowing the filler metal to be heated without adversely affecting the metallic structures.

In some situations, it may be necessary or desirable to limit the flow of the filler metal between the metallic structures being joined. For example, there may be a need to prevent the filler metal from inadvertently brazing surfaces not intended to be connected. There may also be a need to prevent the filler metal from clogging one or more tubes, orifices, or other portions of the structures.

One conventional approach to limiting the flow of filler metal during brazing is to apply a braze stop-off material to one or more of the metallic structures. A braze stop-off material typically represents an oxide material or other material that is applied to part of one or more of the metallic structures. The braze stop-off material reduces or prevents the migration of the filler metal over that part of the metallic structures, thereby limiting where the metallic structures are brazed together by the filler metal. Braze stop-off materials are typically applied to metallic structures by hand, such as by painting or spraying.

SUMMARY

This disclosure provides techniques for providing stop-offs for brazing materials or other materials on structures being joined.

In a first embodiment, a method includes forming a braze stop-off on at least one of multiple components to be brazed together. The braze stop-off includes one or more markings formed on at least one surface of the at least one component. The one or more markings include (i) one or more etches in the at least one surface and/or (ii) one or more oxides formed by localized heating of the at least one surface. The method also includes brazing the multiple components together using a brazing material. The braze stop-off controls or interrupts a flow of the brazing material in a joint between the multiple components during the brazing.

In a second embodiment, a method includes obtaining multiple components to be coupled together. At least one of the multiple components includes a stop-off. The stop-off includes one or more markings formed on at least one surface of the at least one component. The one or more markings include (i) one or more etches in the at least one surface and/or (ii) one or more oxides formed by localized heating of the at least one surface. The method also includes coupling the multiple components together using a melted or liquid material. The stop-off controls or interrupts a flow of the melted or liquid material in a joint between the multiple components during the coupling.

In a third embodiment, an apparatus includes a first structure, a second structure, and a material coupling the first and second structures. At least one of the structures includes a stop-off. The stop-off includes one or more markings formed on at least one surface of the at least one component. The one or more markings include (i) one or more etches in the at least one surface and/or (ii) one or more oxides formed by localized heating of the at least one surface. The stop-off is configured to control or interrupt a flow of the material coupling the structures in a joint between the structures.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
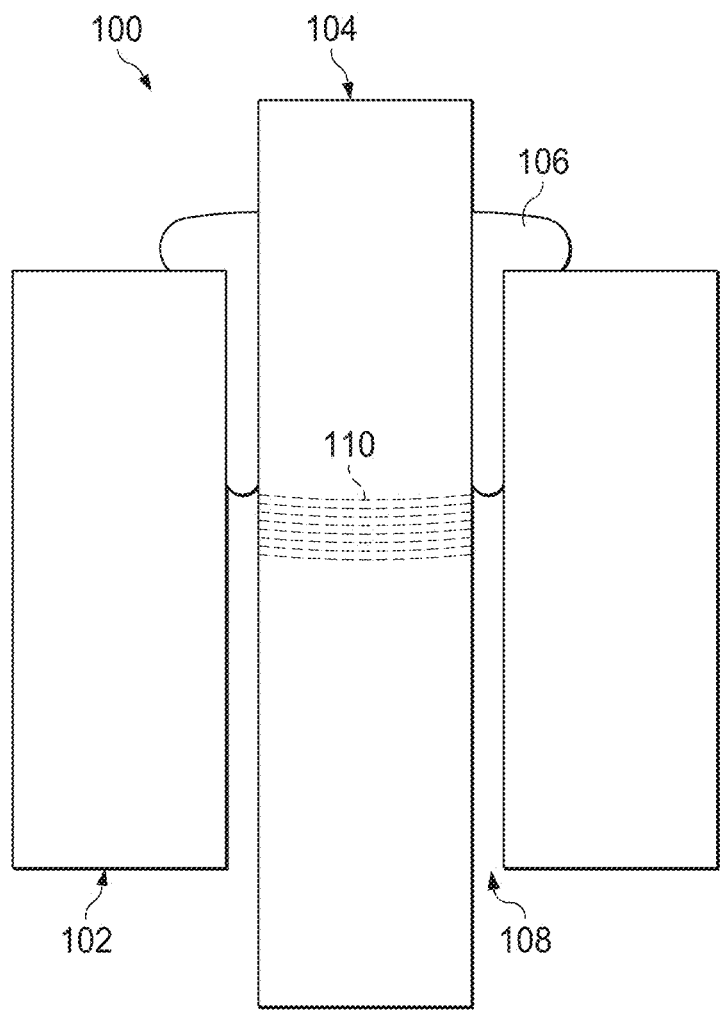
FIG. 1 illustrates a first example of structures being joined with at least one of the structures providing a stop-off in accordance with this disclosure.

FIG. 1 illustrates a first example of structures being joined with at least one of the structures providing a stop-off in accordance with this disclosure. As shown in FIG. 1, a device 100 includes at least two structures 102 and 104 that are brazed together using a filler metal 106. The structures 102 and 104 could denote any suitable metallic structures that are being connected by a metallurgical bond. For example, the structure 104 could denote a pipe or tube, and the structure 102 could denote a manifold or other structure at least partially through which the pipe or tube passes. However, any other suitable structures could be brazed together. Each structure 102 and 104 could be formed from any suitable material(s) and in any suitable manner. In some embodiments, at least one of the structures 102 and 104 could be formed from stainless steel.

The filler metal 106 is used to form the metallurgical bond between the structures 102 and 104 being brazed. The filler metal 106 denotes any suitable metal or metal alloy used to create a metallurgical bond between multiple structures 102 and 104 during brazing. Example types of filler metals could include precious and non-precious brazing filler metals such as Silver, Gold, Palladium, Copper, Cobalt, Manganese, Boron, Molybdenum, Titanium, Niobium, Germanium, Silicon, Iron, Chromium, Tungsten, Nickel, Aluminum, and combinations thereof. The filler metal 106 could also have any suitable form prior to brazing. For example, when the structure 104 denotes a pipe or tube passing into or out of a manifold or other structure 102, the filler metal 106 could originally take the form of a brazing ring placed around the pipe or tube and against the manifold.

As noted above, in conventional brazing techniques, the structures 102 and 104 and the filler metal 106 would be heated, causing the filler metal 106 to melt and flow into at least one joint 108 between the structures 102 and 104. The filler metal 106 then cools, bonding the structures 102 and 104 together. In some situations, it may be necessary or desirable to limit the flow of the filler metal 106 between the structures 102 and 104 being joined, such as to prevent certain surfaces from inadvertently being brazed together or to keep the filler metal 106 out of specific areas.

One conventional approach to limiting the flow of filler metal 106 during brazing is to apply a braze stop-off material to one or more of the structures 102 and 104. While this may be effective in some situations, it may not be effective or viable in certain applications. For example, residual oxides from a braze stop-off material may be extremely difficult to clean from the structures 102 and 104 after brazing. These residual oxides have the potential to break free during later use, such as due to thermal excursions. These residual oxides could then clog filter screens, plug orifices, or create other problems in missiles, cryogenic coolers, or other systems. As a result, conventional braze stop-off materials cannot be used in certain applications because of the risks associated with contamination, foreign object damage, or corrosion.

When a braze stop-off material cannot be used, one typical approach is to simply provide a limited amount of filler metal 106 for a brazing operation while tightly controlling the joint fit between the structures 102 and 104 and the thermal profile of the brazing operation. Ideally, the limited amount of filler metal 106 would still allow the structures 102 and 104 to be joined without allowing the filler metal 106 to enter undesirable areas or inadvertently braze certain surfaces. However, this approach suffers from a number of problems. For example, this approach may allow for the creation of voiding or leak paths in the filler metal 106, which could render the device 100 or a larger system entirely unusable. Also, this approach may still allow the filler metal 106 to enter undesirable areas or to inadvertently braze some surfaces of the structures 102 and 104. In addition, this approach may require large amounts of testing and inspection in order to verify proper brazing of the structures 102 and 104 and to verify proper operation of a larger system. As a result, yields from brazing operations can be heavily dependent on process controls, and manufacturers could suffer extremely high losses when fabricating some brazed components.

In accordance with this disclosure, at least one portion of at least one surface of the structures 102 and 104 to be brazed together includes one or more markings 110. The markings 110 could denote areas where at least one structure 102, 104 has been etched and/or areas where local oxide formation or growth has occurred. In some embodiments, the markings 110 denote areas where both (i) at least one structure 102, 104 has been etched and (ii) local oxide formation or growth has occurred. This could be accomplished in various ways, such as by locally heating portions of the at least one structure 102, 104 to form the etches and create the local oxide formation or growth, such as by using a laser. It is also possible to form the etches (such as by using a laser) and then perform another process to promote the formation or growth of the oxide.

The markings 110 can be used as at least one braze stop-off during a subsequent brazing operation, meaning the markings 110 can interrupt or control the flow of the filler metal 106 over the surface(s) of the structure(s) 102 and 104 during brazing. For example, the filler metal 106 is typically pulled into the joint 108 between the structures 102 and 104 during brazing due to capillary action. The markings 110 interrupt the capillary action of the filler metal 106, thereby reducing or eliminating the flow of the filler metal 106 over certain portions of the structures 102 and 104 being joined. The interruption in the capillary action can be due to various factors, such as the change in the surface texture(s) of the structure(s) 102, 104 or the formation of an oxide layer on the structure(s) 102, 104.

In this example, the markings 110 are formed on one structure 104 being brazed. However, markings 110 could be formed on one, some, or all of the structures 102, 104 being brazed. Also, any suitable number of markings 110 could be formed on the structure(s) 102, 104, and the markings 110 could be formed in any suitable pattern. In some cases, the markings 110 could be between about 5 μm and about 70 μm in depth.

In addition, the markings 110 could be formed in any suitable manner. For example, in some embodiments, the markings 110 could be etched using a laser. The laser's power, scanning speed, Q switch frequency, or other characteristics could be controlled as needed to form the markings 110. The characteristics of the laser could vary based on the material being etched. For instance, different laser characteristics could have different values when etching different types of stainless steel in order to reduce or prevent "sensitization" of the stainless steel. Sensitization occurs when stainless steel is heated and held at a specific temperature, such as between 425° C. and 815° C. (which varies by alloy). At these temperatures, carbides can precipitate by obtaining chromium from grain boundaries, which makes the stainless steel susceptible to intergranular stress corrosion cracking. Testing can be performed to determine optimum laser marking parameters for a specific stainless steel alloy or other material being etched. Note, however, that other techniques could be used to form the markings 110. In general, any suitable technique that can etch or locally heat the surface of a structure to be brazed can be used.

The ability to form braze stop-offs using the markings 110 can provide various advantages depending on the implementation. For example, the markings 110 can be formed on structures 102, 104 with very high precision. As a result, braze stop-offs can be formed at very specific locations on the structures 102, 104, which is typically much harder to accomplish when applying an oxide or other braze stop-off material by hand. This also allows unconventional forms of brazed joints to be created between structures 102, 104, such as brazed joints that are formed using one or more helixes or bands or that purposeful include linear voids. This can greatly increase the design or application possibilities in which brazing is used. Also, the structures 102, 104 can be cleaned after the markings 110 are formed, reducing or eliminating contamination and foreign object damage potential. Moreover, laser or other etching techniques could form only superficial etches of very small depths in the structure (s) 102, 104, thereby providing limited corrosion potential. Further, the precise nature of the markings 110 can help to increase manufacturing yields while reducing costs and schedule risks associated with the manufacture of devices or systems having brazed components. In addition, markings 110 can consistently function as braze stop-offs at the marked locations even in the presence of excess filler metal 106. This can significantly reduce or eliminate the formation of voids or other problems typically associated with the use of an inadequate amount of filler metal 106.

Figure 2:
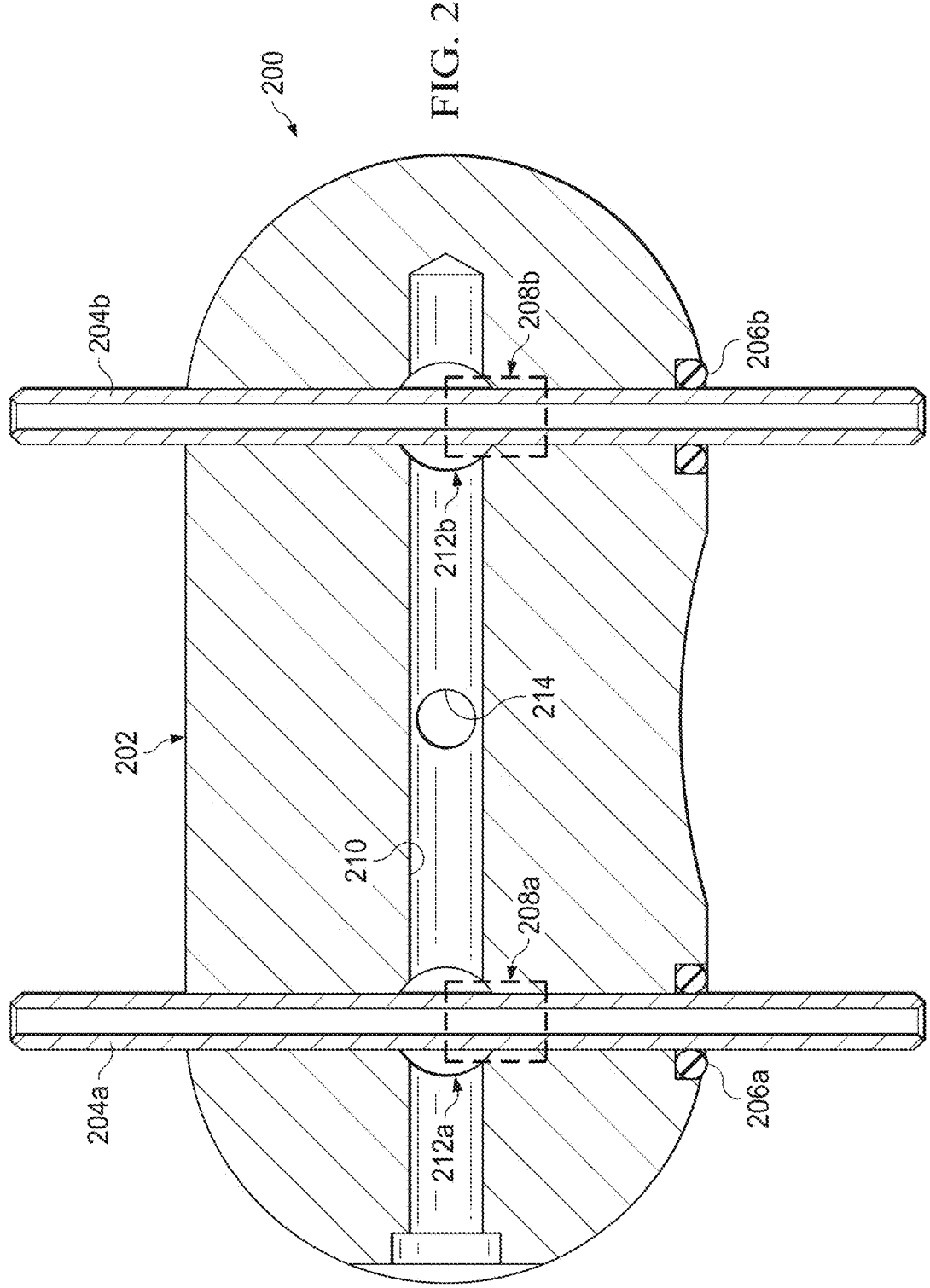
FIG. 2 illustrates a second example of structures being joined with at least one of the structures providing a stop-off in accordance with this disclosure.

FIG. 2 illustrates a second example of structures being joined with at least one of the structures providing a stop-off in accordance with this disclosure. As shown in FIG. 2, a device 200 includes a manifold 202 sealed by brazing to multiple tubes 204a-204b. The tubes 204a-204b extend through the manifold 202. Brazing rings 206a-206b can be positioned around the tubes 204a-204b and can be formed from any suitable filler metal. After being heated, the brazing rings 206a-206b can melt so that the filler metal enters joints between the tubes 204a-204b and the manifold 202, creating metallurgical bonds between the tubes 204a-204b and the manifold 202. The manifold 202 also includes various passageways 210, 212a-212b, and 214.

To help limit where the filler metal of the brazing rings 206a-206b flows during the brazing operation, the tubes 204a-204b include regions 208a-208b, respectively, where markings can be formed on the tubes 204a-204b. As noted above, the markings (such as one or more etched areas or one or more oxide layers) interrupt the capillary action of the filler metal, thereby substantially reducing or eliminating the flow of the filler metal beyond the regions 208a-208b of the tubes 204a-204b. The interruption in the capillary action could be due to various factors, such as the change in the surface texture(s) of the structure(s) 202, 204a-204b or the formation of oxide on the structure(s) 202, 204a-204b. Note that the tops of the tubes 204a-204b could be sealed to the manifold 202 in any suitable manner, such as by brazing or some other technique.

Figure 3:
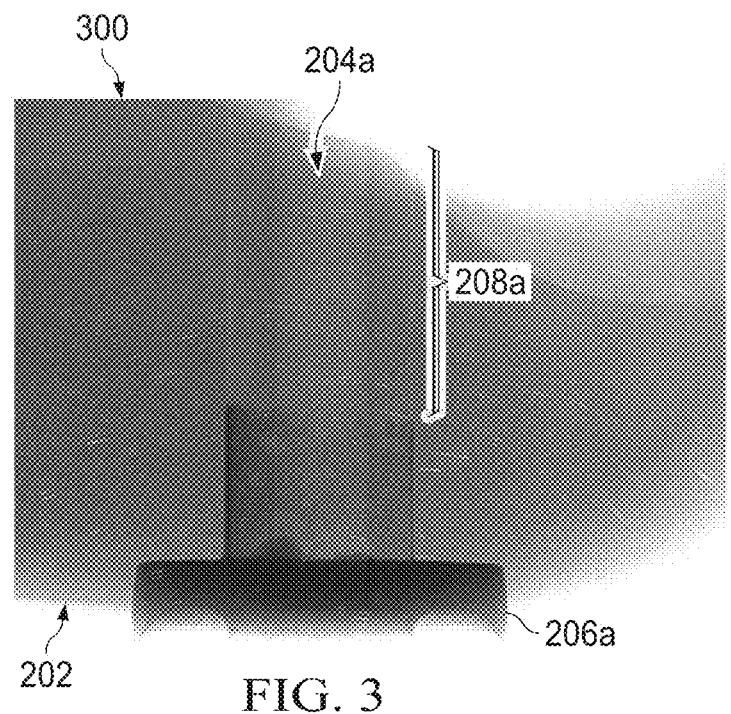
FIG. 3 illustrates an example effect of using a stop-off in one or more structures being joined in accordance with this disclosure.

FIG. 3 illustrates an example effect of using a stop-off in one or more structures being joined in accordance with this disclosure. In particular, FIG. 3 shows an x-ray image 300 of a portion of the device 200 of FIG. 2. As shown in FIG. 3, the brazing ring 206a has been melted, and a portion of the filler metal has entered the joint between the manifold 202 and the tube 204a. The markings in the region 208a act as a braze stop-off, which substantially prevents the filler metal from traveling further along the tube 204a. As a result, the markings in the region 208a help to prevent the filler metal from entering undesired areas or inadvertently brazing surfaces not intended to be connected.

Note that in FIG. 3, a large quantity of filler metal remains in the brazing ring 206a outside of the joint. This indicates that the markings in the region 208a stopped the flow of filler metal during the brazing operation, even in the presence of an excessive amount of filler metal. The markings in the region 208a can therefore significantly reduce or eliminate the formation of voids or other problems typically associated with the use of an inadequate amount of filler metal.

The techniques described here could be used with any suitable type of braze joint between formed to couple multiple structures together. Example types of braze joints can include, but are not limited to, butt joints, lap joints, strapped butt joints, pipe joints, scarf joints, side seam joints, butt lap joints, modified butt joints, modified lap joints, modified butt lap joints, and pierced joints. Moreover, the techniques described here could be used with various brazing applications, such as vacuum brazing, induction brazing, and resistance brazing.

Although FIGS. 1 through 3 illustrate examples of structures being joined and an example effect of using a stop-off, various changes may be made to FIGS. 1 through 3. For example, any suitable structures could be bonded in any suitable manner using a brazing technique. Also, one, some, or all of those structures could include markings acting as one or more braze stop-offs. In addition, any number of markings could be used in any suitable pattern(s) to form any number of braze stop-offs that effectively interrupt the capillary action that pulls filler metal into one or more joints during brazing.

Figure 4A:
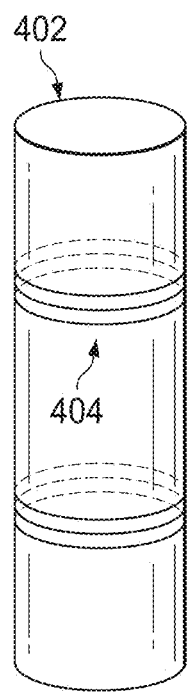
FIGS. 4A and 4B illustrate example markings that provide stop-offs for structures being joined in accordance with this disclosure.
Figure 4B:
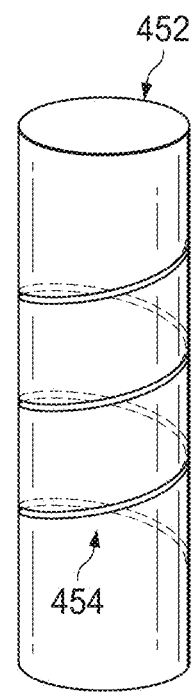

FIGS. 4A and 4B illustrate example markings that provide stop-offs for structures being joined in accordance with this disclosure. As shown in FIG. 4A, a structure 402 to be brazed includes multiple bands of markings 404 around the structure 402. Each set of bands can include any number of markings 404, and those markings 404 could have any suitable dimensions and spacings. This type of arrangement of markings 404 could be useful, for instance, when multiple areas (such as opposite ends) of the structure 402 are to be attached to another structure or structures during a brazing operation.

As shown in FIG. 4B, a structure 452 to be brazed includes markings 454 forming at least one helix around at least part of the structure 452. Each helix can include any number of markings 454, and those markings 454 could have any suitable dimensions and spacings. This type of arrangement of markings 454 could be useful, for instance, when the filler metal will traverse a helical path around the structure 452 during brazing.

Although FIGS. 4A and 4B illustrate examples of markings that provide stop-offs for structures being joined, various changes may be made to FIGS. 4A and 4B. For example, any other suitable patterns could be formed on at least part of one or more structures to be brazed using one or more markings.

Figure 5:
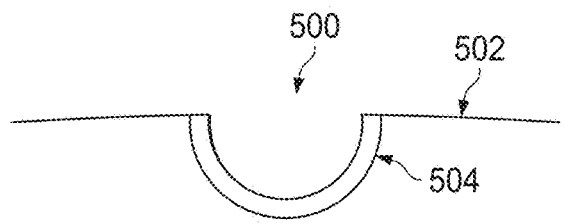
FIG. 5 illustrates an example cross-section of a marking that acts as a stop-off in a structure being joined in accordance with this disclosure.

FIG. 5 illustrates an example cross-section of a marking 500 that acts as a stop-off in a structure being joined in accordance with this disclosure. The marking 500 could be formed in any of the structures described above or in any other structure to be brazed. The marking 500 could also be formed in any suitable manner, such as via laser etching or other localized heating.

As shown in FIG. 5, the marking 500 is formed in the surface of a structure, creating a valley or dip in the structure's surface. One or more marking 500 in the structure's surface can function as a braze stop-off during a brazing operation. The marking(s) 500 could form any suitable pattern on the structure to be brazed.

As noted above, the one or more markings 500 can interrupt or control the flow of a filler metal during a brazing operation by affecting the capillary action of the filler metal. The interruption in the capillary action can be due to various factors. For example, the presence of the marking(s) 500 could change a surface texture 502 of a structure, which can interrupt the normal flow of the filler metal during brazing. As another example, an oxide layer 504 could be formed or grown within or around the marking(s) 500, which can interrupt the normal flow of the filler metal during brazing. These factors could operate individually or collectively (possibly with other factors) to interrupt the capillary action and act as a stop-off for the brazing material.

While shown here as residing entirely within an etch, at least a portion of the oxide layer 504 could extend outside the etch. As noted above, the etch and oxide could be formed during the same operation (such as laser etching), or the etch could be formed during one operation and the oxide can be performed during a subsequent operation.

Although FIG. 5 illustrates one example of a cross-section of a marking 500 that acts as a stop-off in a structure being joined, various changes may be made to FIG. 5. For example, the exact shape and size of the marking 500 in FIG. 5 is for illustration only.

Figure 6:
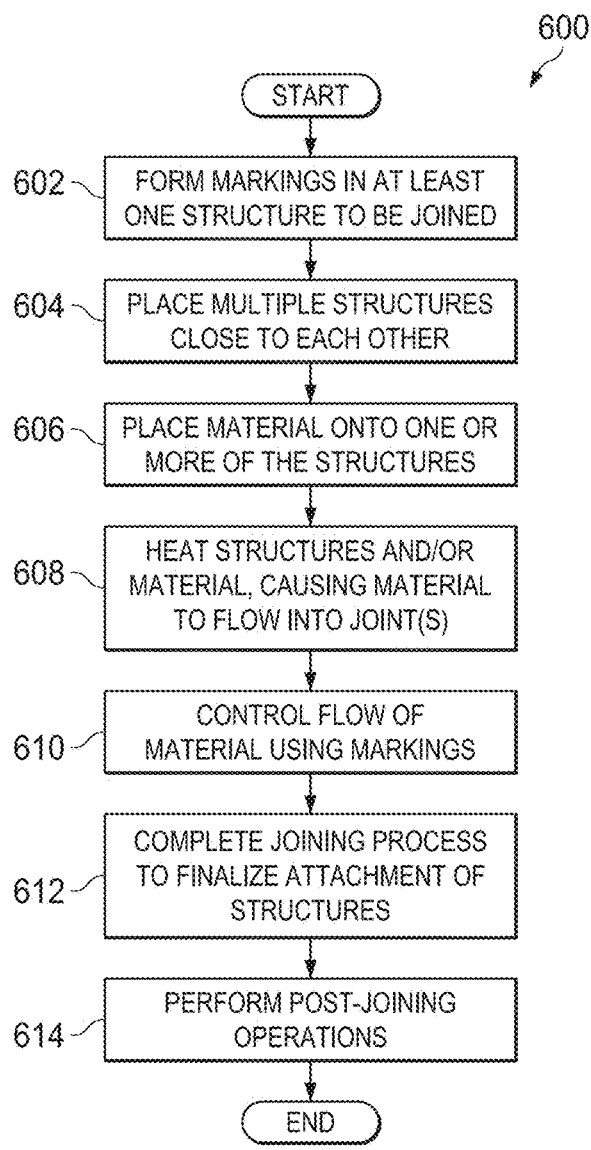
FIG. 6 illustrates an example method for providing a stop-off in one or more structures being joined in accordance with this disclosure.

FIG. 6 illustrates an example method 600 for providing a stop-off in one or more structures being joined in accordance with this disclosure. For ease of explanation, the method 600 is described as being used with the device 100 shown in FIG. 1. However, the method 600 could be used to braze components of any other suitable device or system, including any of the structures described above.

As shown in FIG. 6, one or more markings are formed in at least one structure to be joined at step 602. This could include, for example, using a laser or other device to etch one or more markings 110 into at least one structure 102, 104 to be brazed. This could also or alternatively include using a laser or other device to locally heat areas of at least one structure 102, 104 to form at least one oxide. As noted above, the etch and the oxide could be formed during a common operation or during different operations. Also as noted above, any suitable number of markings 110 could be formed in a variety of patterns on one or more of the structures 102, 104 to be brazed. If a laser is used, one or more characteristics of the laser could be adjusted based on the material forming the structure.

Multiple structures are placed close to one another at step 604, and filler material is placed on one or more of the structures at step 606. This could include, for example, placing one structure 104 through another structure 102. Of course, any other suitable arrangement of structures to be brazed together could be used. This could also include placing a brazing ring or other suitable filler metal 106 or on near a joint between the structures to be brazed.

The structures and the filler material are heated at step 608. This could include, for example, placing the structures 102 and 104 and the filler metal 106 into a vacuum oven or other oven and heating the components above a melting point of the filler metal 106 (but below a melting point of either structure 102, 104). This causes at least some of the filler metal 106 to flow into one or more joints 108 between the structures 102 and 104. During this time, the flow of the filler material is controlled using the markings at step 610. This could include, for example, the markings 110 stopping substantially all of the filler metal 106 from passing the beyond the region containing the markings 110. While a small amount of filler metal 106 might pass one, some, or even all of the markings 110, that amount of material is not enough to clog tubes, orifices, or other portions of the brazed structures or otherwise interfere with proper operation of a device or system.

The joining process is completed at step 612. This could include, for example, allowing the structures 102 and 104 to cool, hardening the filler metal 106 and forming a metallurgical bond between the structures 102 and 104. Any necessary post-joining operations can occur at step 614. This could include, for example, coupling the brazed structures to other structures in order to fabricate a complete device or system.

Although FIG. 6 illustrates one example of a method 600 for providing a stop-off in one or more structures being joined, various changes may be made to FIG. 6. For example, while shown as a series of steps, various steps in FIG. 6 could overlap, occur in parallel, occur in a different order, or occur any number of times.

Note that while the use of markings to control the flow of a filler metal or other brazing material is described above, the same type of approach could be used to control the flow of other materials used in other processes. For instance, markings could be used to interrupt or control the flow of solder used to couple electrical or other components. As a particular example, markings could be formed in printed circuit boards (PCBs) or components mounted on or to the PCBs. In general, the techniques described in this patent document can be applied to various procedures in which melted or liquid material flows between components in order to bond those components together, where markings formed by one or more etches and/or one or more oxides can be used to interrupt or control the flow of the melted or liquid material.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. A method comprising:
forming a braze stop-off on at least one of multiple components to be brazed together, the braze stop-off comprising one or more markings formed on at least one surface of the at least one component, the one or more markings comprising at least one of: (i) one or more etches in the at least one surface and (ii) one or more oxides formed by localized heating of the at least one surface; and
brazing the multiple components together using a brazing material, wherein the braze stop-off controls or interrupts a flow of the brazing material in a joint between the multiple components during the brazing;
wherein the one or more markings form at least one helix around the at least one component.

2. The method of claim 1, wherein the braze stop-off controls or interrupts the flow of the brazing material in the joint by altering a surface texture of the at least one component.

3. The method of claim 1, wherein the one or more oxides of the braze stop-off control or interrupt the flow of the brazing material in the joint.

4. The method of claim 1, wherein the one or more markings also form at least one band around the at least one component.

5. The method of claim 1, wherein the multiple components comprise:
a pipe or tube, the one or more markings formed on an outer surface of the pipe or tube; and
a manifold through which the pipe or tube at least partially passes.

6. The method of claim 1, wherein forming the braze stop-off comprises forming the one or more markings using a laser.

7. The method of claim 6, further comprising:
controlling one or more characteristics of the laser based on a material forming the at least one component.

8. A method comprising:
obtaining multiple components to be coupled together, at least one of the multiple components comprising a stop-off, the stop-off comprising one or more markings formed on at least one surface of the at least one component, the one or more markings comprising at least one of: (i) one or more etches in the at least one surface and (ii) one or more oxides formed by localized heating of the at least one surface; and
coupling the multiple components together using a melted or liquid material, wherein the stop-off controls or interrupts a flow of the melted or liquid material in a joint between the multiple components during the coupling;
wherein the one or more markings form at least one helix around the at least one component.

9. The method of claim 8, wherein the stop-off controls or interrupts the flow of the melted or liquid material in the joint by altering a surface texture of the at least one component.

10. The method of claim 8, wherein the one or more oxides of the stop-off control or interrupt the flow of the melted or liquid material in the joint.

11. The method of claim 8, wherein the one or more markings are formed using a laser.

12. The method of claim 8, wherein the one or more markings interfere with a capillary action that pulls the melted or liquid material into the joint.

13. The method of claim 12, wherein the one or more markings prevent the melted or liquid material from reaching one or more areas of the components being coupled together.

14. An apparatus comprising:
a first structure;
a second structure; and
a material coupling the first and second structures;
wherein at least one of the structures comprises a stop-off, the stop-off comprising one or more markings formed on at least one surface of the at least one component, the one or more markings comprising at least one of: (i) one or more etches in the at least one surface and (ii) one or more oxides formed by localized heating of the at least one surface, the stop-off configured to control or interrupt a flow of the material coupling the structures in a joint between the structures; and
wherein the one or more markings form at least one helix around the at least one component.

15. The apparatus of claim 14, wherein:
the first structure comprises a tube or pipe;
the second structure comprises a manifold, at least a portion of the tube or pipe inserted into the manifold; and
the material coupling the structures seals the tube or pipe to the manifold.

16. The apparatus of claim 14, wherein:
the one or more markings comprise one or more laser-etched markings; and
the material coupling the structures comprises a filler metal used in a brazing operation.

17. The apparatus of claim 14, wherein the stop-off is configured to control or interrupt the flow of the material coupling the structures by altering a surface texture of the at least one structure.

18. The apparatus of claim 14, wherein the one or more oxides of the stop-off are configured to control or interrupt the flow of the material in the joint.

19. The apparatus of claim 14, wherein the one or more markings also form at least one band around the at least one structure.

20. The apparatus of claim 15, wherein the one or more markings are formed on an outer surface of the tube or pipe.

* * * * *